United States Patent
Matsumoto

[11] Patent Number: 5,831,695
[45] Date of Patent: Nov. 3, 1998

[54] ACTIVE MATRIX LIQUID CRYSTAL DISPLAY

[75] Inventor: Fuminao Matsumoto, Hino, Japan

[73] Assignee: Ricoh Company, Ltd., Tokyo, Japan

[21] Appl. No.: 727,781

[22] Filed: Oct. 8, 1996

[30] Foreign Application Priority Data

Oct. 9, 1995 [JP] Japan ................................ 7-287906

[51] Int. Cl.⁶ .............................. G02F 1/136; G02F 1/133
[52] U.S. Cl. ................................................ 349/52; 349/51
[58] Field of Search ................................ 349/49, 50, 51, 349/52, 158; 345/90, 91

[56] References Cited

U.S. PATENT DOCUMENTS

| | | | |
|---|---|---|---|
| 5,101,288 | 3/1992 | Ohta et al. | 349/52 |
| 5,142,390 | 8/1992 | Ohta et al. | 349/52 |
| 5,442,224 | 8/1995 | Yoshimizu et al. | 349/51 |
| 5,485,294 | 1/1996 | Sugiyama et al. | 349/151 |
| 5,543,945 | 8/1996 | Kimura et al. | 349/171 |

FOREIGN PATENT DOCUMENTS

| | | |
|---|---|---|
| 2-26 | 1/1990 | Japan . |
| 2289828 | 11/1990 | Japan . |
| 486810 | 3/1992 | Japan . |
| 5-150272 | 6/1993 | Japan ..................................... 349/51 |

*Primary Examiner*—William L. Sikes
*Assistant Examiner*—Tai V. Duong
*Attorney, Agent, or Firm*—Cooper & Dunham LLP

[57] ABSTRACT

An active-matrix liquid crystal display has a metal-insulator-metal (MIM) switching device provided in each of the pixels of the display. The MIM switching device includes a hard carbon film disposed as an insulating layer between a first and a second conductor and exhibits excellent and reliable switching operations, thereby providing liquid crystal displays with high display quality and low power consumption.

8 Claims, 6 Drawing Sheets

ACTIVE MATRIX LIQUID CRYSTAL DISPLAY

BACKGROUND OF THE INVENTION

1. Field of the Invention

The present invention relates to an active-matrix liquid crystal display having a metal-insulator-metal device as a switching element in each of the pixels of the display, the device including a hard carbon film disposed as an insulating layer between conductors of the device for providing the liquid crystal display with high display quality and low power consumption.

2. Discussion of the Background

Liquid crystal (LC) technology has made significant progress in recent years in expanding the size and improving the resolution and performance of matrix-addressed liquid crystal displays. Although multiplexed liquid crystal displays have already been introduced into the market, active-matrix (AM) displays are a preferred solution for large-area, high information-content, color display, and gray-scale display applications.

An AM liquid crystal display incorporates an active matrix circuit in the liquid crystal cell to assist the electrical addressing of the cell. The AM circuit has an active device in every pixel element, which is defined by the crossover of row and column bus lines. In a broad definition, the active device in an AM liquid crystal display is often interpreted as a device with non-linear characteristics. The non-linear element can either be a two-terminal or a three-terminal device. Metal-insulator-metal (MIM) switching devices and thin film transistors (TFTs), respectively, are examples of these two devices.

MIM switching devices for AM liquid crystal displays have potential advantages over TFTs because of its simplicity in device construction and savings in fabrication costs of the two-terminal devices, while providing high quality displays, as a result of its relatively high aperture ratio. In addition, because of their light weight and low power consumption, MIM switching devices have received attention, especially in the field of liquid crystal applications, such as for portable and reflection types of information displays.

For two-terminal devices such as MIM devices, there exists a shortcoming of not being capable of performing a complete switching function (that is, not achieving a sufficiently high ON/OFF current ratio) compared with three-terminal devices such as TFTs. For MIM devices to be satisfactorily utilized as switching elements in liquid crystal displays, therefore, it is necessary to optimize various device parameters, such as electrical non-linearity and capacitance of the MIM switching devices, as well as to optimize the electrical and electro-optical properties of the liquid crystal layers interposed between the electrodes of the MIM switching devices.

In this regard, it has been proposed that the capacitance of an MIM diode be smaller than that of the liquid crystal layer in order to achieve a high quality liquid crystal display. However, there has not been found a detailed disclosure on the relationship between various device parameters of MIM diodes. In Japanese Laid-Open Patent Application H2-00026, for example, the capacitance of an active switching diode is simply described as being sufficiently smaller than that of the liquid crystal layer without further description.

It has been disclosed by the present inventor that MIM liquid crystal displays can be fabricated using a hard carbon film, or diamond-like carbon (DLC) film, as an insulating layer of the switching device. The hard carbon film exhibits desirable electrical properties such as, for example, a wide resistivity range, which can be achieved by changing process parameters (Japanese Laid-Open Patent Applications H2-289828 and H486810). However, device parameters for switching devices using hard carbon films still have to be optimized for liquid crystal displays.

SUMMARY OF THE INVENTION

Accordingly, one object of the present invention is to provide an active-matrix (AM) liquid crystal display which overcomes the above-noted difficulties.

A further object of the present invention is to provide an AM liquid crystal display having a switching element in each of the pixels of the display, the switching element comprising a first conductor as an electrode, a second conductor as the pixel electrode, and a hard carbon film disposed between the first and second conductors to form a metal-insulator-metal (MIM) switching device capable of carrying out excellent and reliable switching operation, thereby providing liquid crystal displays with high display quality and low power consumption.

These and other objects of the present invention have been satisfied by the discovery of an AM liquid crystal display comprising a top insulating substrate and a bottom insulating substrate, a plurality of delineated electrodes disposed on the top substrate, a plurality of pixel electrodes disposed on the bottom substrate, a liquid crystal layer disposed between the substrates, and an MIM switching device provided in each pixel of the display. The MIM switching device includes a first conductor as an electrode, a second conductor connected to a pixel electrode, and a hard carbon film disposed between the first conductor and the second conductor, wherein the MIM switching device exhibits a current (I) vs. voltage (V) characteristic represented by the equation $$ln(|I|/S) = \beta\sqrt{|v|} + \kappa \qquad (1)$$

with $\kappa < -35$, I being the current through the switching device, V being the potential applied between the first and second electrodes, S being the area of the switching device, and $\beta$ and $\kappa$ being parameters. For $V \geq 0$, $I \geq 0$; and for $V < 0$, $I < 0$.

According to an alternative embodiment, the switching MIM device in the pixel element of the AM liquid crystal display exhibits the I-V characteristic represented by equation (1) above, with $\beta < 7$.

In another embodiment, the capacitance ratio of the MIM switching device to the liquid crystal layer is less than or equal to $1/3$.

In yet another embodiment, the capacitance ratio of the MIM switching device to the liquid crystal layer is greater than or equal to $1/30$.

In another embodiment, at least one of the top insulating substrate and the bottom insulating substrate of the liquid crystal display is made of a film or a sheet of plastic.

These and other objects, features and advantages of the present invention will become apparent upon consideration of the following description of the preferred embodiments of the present invention taken in conjunction with the accompanying drawings.

DESCRIPTION OF THE PREFERRED EMBODIMENTS

Figure 1:
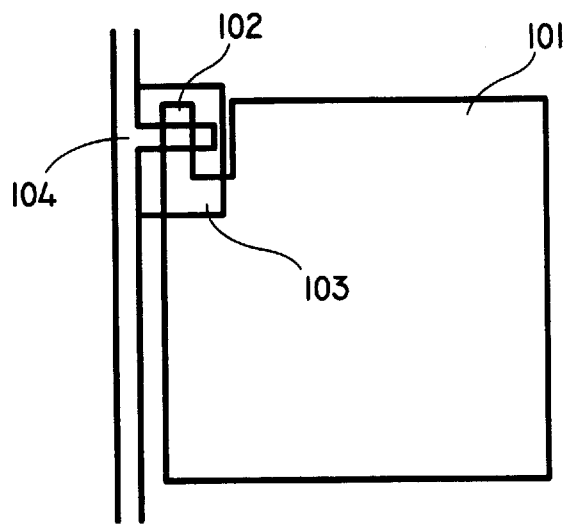
FIG. 1 is a schematic view of an AM liquid crystal display of the present invention.

In the detailed description which follows, embodiments of the present invention particularly useful in liquid crystal display applications are described. It is understood, however, that the present invention is not limited to these embodiments. For example, it is appreciated that the MIM switching devices of the present invention are adaptable to any form of matrix-addressed circuitry and system. Other embodiments will be apparent to those skilled in the art upon reading the following description.

The invention provides an AM liquid crystal display, comprising top and a bottom insulating substrates, a plurality of delineated electrodes disposed on a top electrode, a plurality of pixel electrodes disposed on a bottom electrode, a liquid crystal layer disposed between the substrates, and an MIM switching device provided in each pixel of the display. The MIM switching device comprises a first conductor as an electrode, a second conductor connected to a pixel electrode, and a hard carbon film disposed between the first and second conductors.

The current through the MIM switching device, having a hard carbon film as an insulating layer of the switching device, is generally known to exhibit a highly non-linear Poole-Frenkel type relationship between the current and the voltage. The relationship is known to be expressed by either one of the following equations $$|I| = \alpha \cdot \exp(\beta \sqrt{|V|}) \text{ or}$$

$$|I| = \alpha \cdot V \cdot \exp(\beta \sqrt{|V|}),$$

where I is the current through the switching device, V is the voltage applied to the device, α is a constant, and β is a constant of non-linearity. For $V \geq 0$, $I \geq 0$; and for $V < 0$, $I < 0$.

The above-mentioned parameters α and β can be varied by controlling the properties of the hard carbon film by controlling various deposition conditions. The MIM switching devices can be fabricated so as to satisfy the requirements for liquid crystal displays, such as the mode, size, and density of the display, as well as the contrast, gray-scale, response time, and driving voltage for display operation. In addition, since a hard carbon film can be deposited at room temperature, materials other than glass, such as plastics, for example, can also be used as the substrate for the electrodes to be deposited thereon.

The above-mentioned hard carbon film is also referred to as diamond-like carbon (DLC), amorphous diamond, or diamond thin film. The hard carbon film can be deposited by various vapor phase growth methods.

A source gas for film deposition by the above-mentioned methods can be selected from a number of carbon producing materials. The source gas material is not limited to gaseous substances but can also include substances which are rendered in a gaseous state at elevated temperatures. Examples of these source gas materials include hydrocarbons such as methane, ethane, and butane; alcohol; ether; ester; ketone; and carboxylic acid.

Deposition of the hard carbon film from the source gas can be carried out by a vapor phase growth method such as plasma chemical vapor deposition (CVD) using for excitation energy dc, low frequency or high frequency ac, or microwave sources.

As the materials for the top and bottom electrodes of the MIM devices, metals such as nickel, chromium, molybdenum, titanium, aluminum, tantalum, gold, silver, or platinum may be employed, and these metals can be deposited by conventional vacuum deposition or by sputter deposition.

Having generally described this invention, a further understanding can be obtained by reference to certain specific examples which are provided herein for purposes of illustration only and are not intended to be limiting.

EXAMPLES

Example 1

A transparent electrically conductive film of indium tin oxide (ITO) was deposited by conventional sputter deposition onto a non-alkaline glass substrate to obtain a sheet resistance of 200 ohm/□ for the ITO film. On top of the ITO conductive film was deposited a bottom electrode film of chromium having a thickness of 540 nm, which is subsequently defined into pixel patterns by photolithography followed by the removal of the residual photoresist film.

A hard carbon film was then deposited by plasma CVD using methane as the source gas at a pressure of 5 Pa in a plasma reaction chamber. In plasma deposition, the properties and thickness of the hard carbon film can be controlled by varying gas pressure, rf input power to the plasma, and deposition time. In the plasma CVD deposition of the present example, conditions were varied from 0.1 to 50 W/cm$^2$ for rf input power and from 0.1 to 1000 Pa for gas pressure.

A nickel film was subsequently sputter deposited as a top electrode to a thickness of 100 nm. Other materials can be used as the top electrode, such as the aforementioned materials, and can be selected depending on the desired properties of the display, such as size and pixel density.

In this example, there was not much change observed in the properties of the MIM device caused by a difference in the materials used as the top electrode. However, some observed differences include changes in wiring resistance and the etching process after top electrode film formation.

Following patterning of the top electrode, the portion of the hard carbon film and the bottom electrode overlying the pixel electrode were removed and a resultant MIM device board was produced having a plurality of MIM devices. FIG. 1 shows an AM liquid crystal display of the present invention having a pixel electrode 101, a bottom electrode 102, a hard carbon film 103, and a top electrode 104.

Figure 2:
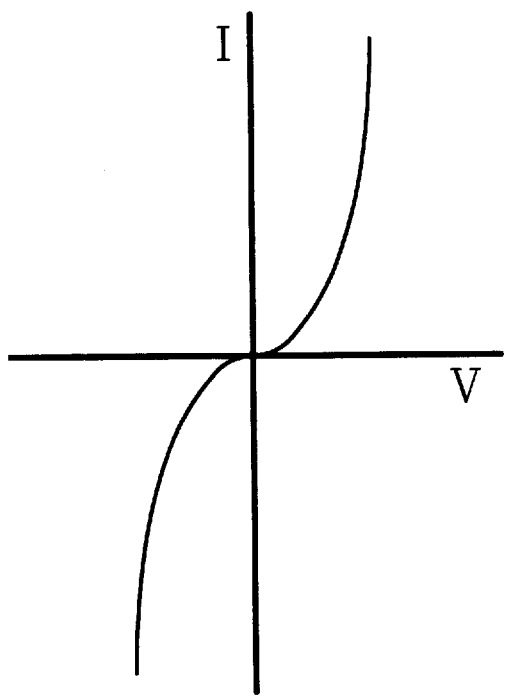
FIGS. 2 and 3 are graphs showing a typical I-V curve and ln|I| vs. √|V| relationship, respectively, of an MIM switching device of the present invention.
Figure 3:
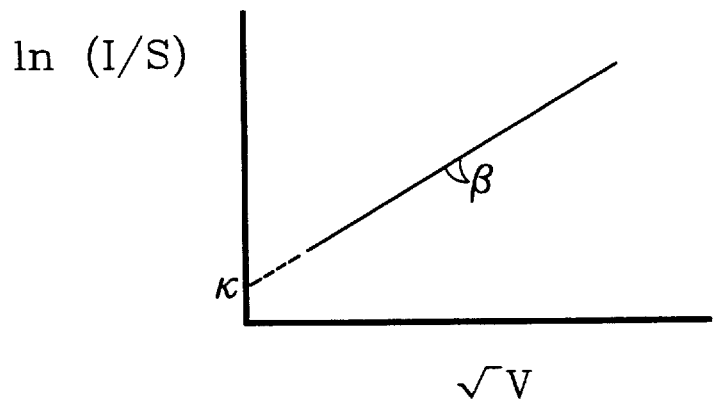

Subsequently, current vs. voltage measurements were carried out for the MIM device board, wherein the current through each MIM switching device was measured with a changing voltage applied between the top electrode and the pixel electrode to obtain an I-V curve. The I-V curve for the MIM switching device exhibits a non-linear characteristic, as shown in FIG. 2, indicative of the Poole-Frenkel type of electrical conduction for the MIM device, as aforementioned. The I-V curve is generally known to be expressed by the equation $$ln(|I|/S) = \beta \sqrt{|V|} + \kappa \tag{1}$$

where $S(pm^2)$ is the area of the switching device. For $V \geq 0$, $I \geq 0$; and for $V<0$, $I<0$. The relationship can also be plotted in a linear form in terms of $ln|I|$ vs. $\sqrt{|V|}$, as shown in FIG. 3. The slope and the intercept on the y axis of the line in FIG. 3 correspond to the parameters $\beta$ and $\kappa$, respectively. The larger the parameter $\epsilon$ is, the greater the non-linearity of the MIM switching device and the larger $\kappa$ becomes, such that the current flows with less resistance through the device.

Figure 4:
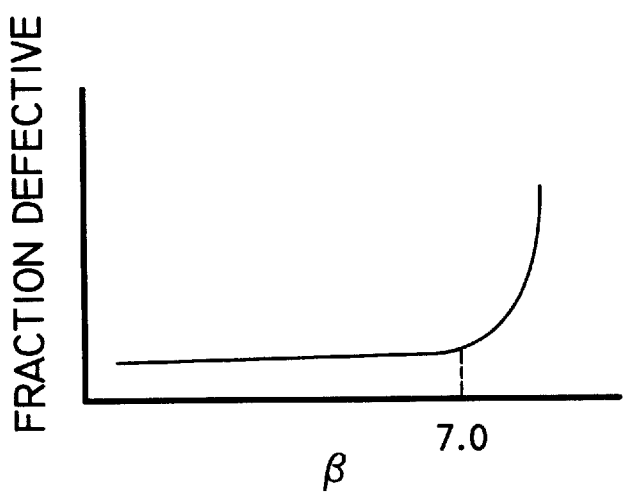
FIG. 4 is a graph showing the relationship between the fraction of defective devices and the parameter β after 1000 continuous switching cycles of an MIM switching device of the invention.

A plurality of MIM switching devices were fabricated with various resultant $\beta$ values and were subjected to continuous switching operation. In the switching operation, driving signals which simulated pixel driving conditions were applied for 1000 hours between the top and the bottom electrodes of the pixel. After the switching operation, I-V measurements were carried out. The results indicate that when the parameter $\beta$ exceeds 7, the fraction of defective MIM devices increases rapidly with increasing $\beta$. Thus, the durability of a liquid crystal display can be improved by controlling the $\beta$ values to be no greater than 7. The change in the percent of defective devices as a function of the parameter $\beta$ in the present invention is shown in FIG. 4.

Example 2

A transparent electrically conductive film of indium tin oxide (ITO) was deposited by conventional sputter deposition onto a soda-lime glass substrate having a thickness of 1.1 mm to obtain a sheet resistance of 200 ohm/□ for the ITO film. On top of the conductive ITO film was deposited a bottom electrode consisting of chromium and aluminum successively deposited to a thickness of 30 nm, which was subsequently defined into pixel patterns by photolithography followed by removal of the residual photoresist film.

A hard carbon film was then deposited by plasma CVD using methane as the source gas at a pressure of 10 Pa in a plasma reaction chamber.

Chromium and aluminum were successively deposited again as a top electrode and subsequently defined into pixel patterns by photolithography.

Figure 5:
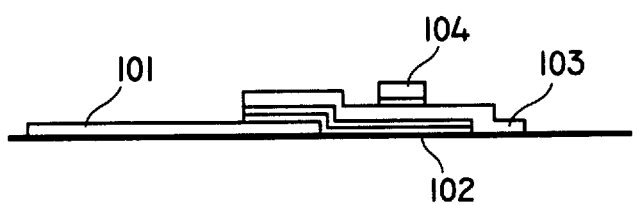
FIG. 5 is a sectional view through the MIM switching device of Example 2.

Following patterning of the top electrode, the portion of the hard carbon film and the bottom electrode overlying the pixel electrode were removed and a resultant MIM device board was produced, as shown in FIG. 5. Current vs. voltage measurements were subsequently carried out for the MIM device board in a manner similar to Example 1. Following the measurements, the MIM device board was rubbed in predetermined directions to obtain alignment of the liquid crystal molecules.

A second board was prepared having delineated ITO transparent conductive electrodes as counter electrodes, similar to those of conventional multiplexed liquid crystal displays. The second board was also rubbed to obtain alignment. The position of the second board relative to the MIM device board was then accurately adjusted in a prescribed manner. Subsequently, these two boards were pressed and vacuum filled with liquid crystal molecules, and then sealed. Accordingly, a twisted nematic (TN) liquid crystal display of the normally white mode was obtained.

A plurality of liquid crystal displays using various MIM switching devices having different values of the parameter $\kappa$ were fabricated and subjected to operation tests. The results of the tests indicate that the duty ratio of the displays rapidly decreases with increasing $\kappa$ for MIM devices having a $\kappa$ of $-35$ or greater. Therefore, high duty operation has been found to be feasible by controlling the $\kappa$ values to be no greater than $-35$ for TN liquid crystal displays.

Figure 6:
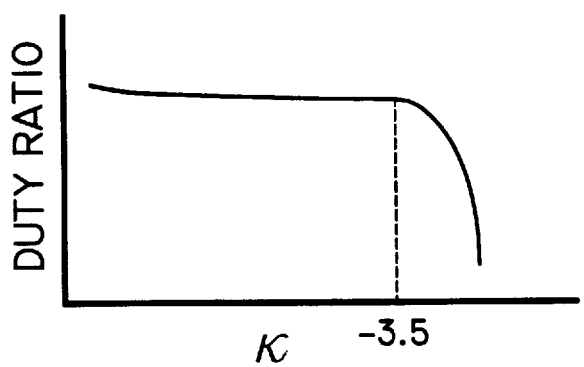
FIG. 6 is a graph showing the relationship between duty ratio and the parameter κ of the MIM switching device of Example 2.

The relationship between the duty ratio and the parameter $\kappa$ is shown in FIG. 6.

Example 3

A liquid crystal display having MIM switching devices can be approximately represented by an equivalent circuit of an MIM device and a liquid crystal layer connected in series. The equivalent circuit is illustrated in FIG. 6, where 201 and 202 represent the capacitance and the resistance of the liquid crystal layer, respectively, and 203 and 204 represent the capacitance and the resistance of the MIM device, respectively. Since the resistance of the MIM device changes with the potential applied between the top and bottom electrodes, the element 204 is shown as a variable resistor in the figure. The capacitance and the resistance of the liquid crystal layer varies with the type of liquid crystal material used, the area of the pixel electrode, and/or the thickness of the liquid crystal layer. Similarly, the capacitance of the MIM device is determined by the area of the switching device and the thickness and properties of the hard carbon film, the area of the switching device being defined by the overlap of the top and bottom electrodes. The above-mentioned area can be varied by changing the width of at least one of the top and bottom electrodes. Also, the thickness and properties of the hard carbon film are controlled by changing deposition conditions.

Figure 7:
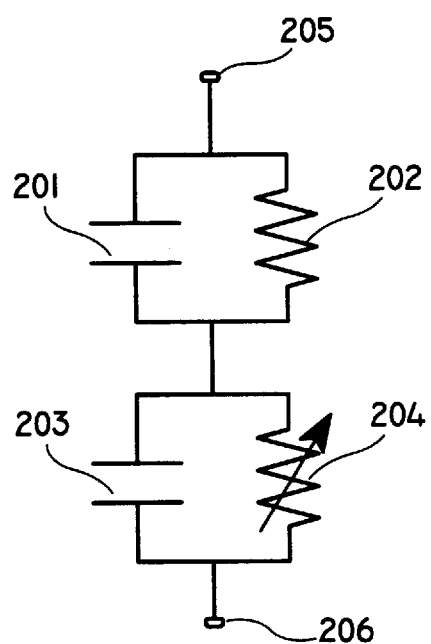
FIG. 7 is an illustration showing an equivalent circuit for the liquid crystal display of Example 3.

The voltage applied between the terminals 205 and 206 is divided into the liquid crystal layer and the MIM device, as shown by the equivalent circuit in FIG. 7. In a case where the resistance of the MIM device is reduced by applying an addressing voltage to its I-V characteristics, the voltage is divided according to the capacitance of the liquid crystal layer and the MIM device. Therefore, the capacitance of the liquid crystal layer has to be sufficiently large compared with that of the MIM device in order to be able to apply a high enough potential and satisfactorily control the optical property of the liquid crystal layer. In practice, however, because of the highly non-linear I-V characteristics of MIM devices, the magnitude and the ratio of the capacitance of these two elements cannot be calculated to a high degree of certainty. In the present invention, therefore, the fabrication and tests of a plurality of liquid crystal displays having various capacitance ratios were carried out to find the magnitude and the ratio of the capacitance of these elements. It was found that the liquid crystal displays operated satisfactorily for a capacitance ratio of the MIM device to the liquid crystal layer, $C_{MIM}/C_{LCL}$, of 1/3 or less when liquid crystal materials operable at 0 to 5 volts were used and the capacitance values were those measured at 0 volts.

Figure 8:
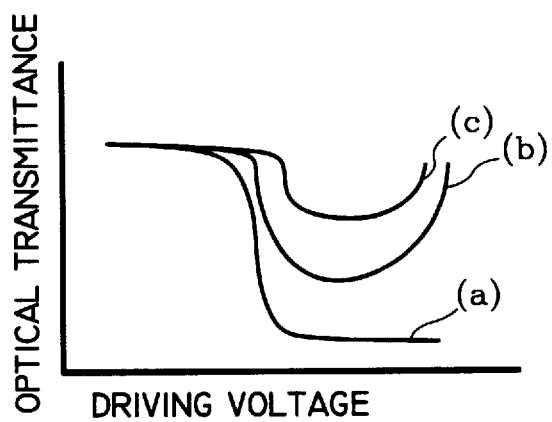
FIG. 8 is a graph showing an optical transmittance vs. driving voltage relationship for different values of capacitance ratio of an MIM device to a liquid crystal layer.

The change in the optical transmittance of the liquid crystal display panels with applied voltage is shown in FIG. 8 for various capacitance ratios. In the figure, the curve (a) represents a ratio of 1/3 and illustrates a normal change in optical transmittance with voltage. However, the curves (b) and (c) representing ratios of 2/5 and 1/2, respectively, show no significant decrease in transmittance with increasing applied voltage, which is indicative of a reduced effective voltage for the liquid crystal layers of the display.

Example 4

A transparent conductive film of indium tin oxide (ITO) was deposited by sputter deposition onto a soda-lime glass substrate having a thickness of 1.1 mm to obtain a sheet resistance of 200 ohm/□ for the ITO film. On top of the conductive film was deposited a bottom electrode consisting of chromium and aluminum successively deposited to a thickness of 30 nm each, which was subsequently defined into pixel patterns by photolithography followed by removal of the residual photoresist film.

A hard carbon film was then deposited by plasma CVD using methane as the source gas. The properties of the resultant film can be controlled by controlling at least one of the following deposition conditions: gas pressure in the reaction chamber, rf input power, or deposition time.

Chromium and aluminum were successively deposited again as a top electrode and subsequently defined into pixel patterns by photolithography. The portion of the hard carbon film and the bottom electrode overlying the pixel electrode were removed and a resultant MIM device board was produced. Current vs. voltage measurements were subsequently carried out for the MIM device board in a manner similar to Example 1.

Following the measurements, twisted nematic (TN) liquid crystal displays were fabricated in a manner similar to Example 2, the displays having a plurality of MIM devices having various values of parameters κ and β.

Figure 9:
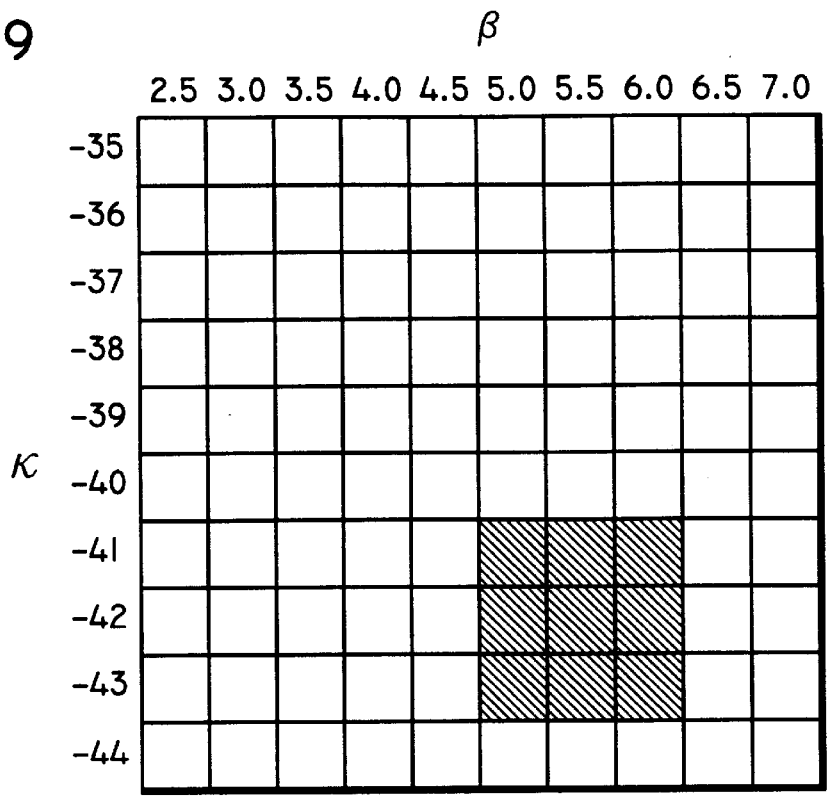
FIG. 9 is an illustration showing the range of preferred values of κ and β for the bi-level operation of the twisted nematic (TN) type of liquid crystal display of Example 4.

The results of the tests indicate that the liquid crystal displays exhibit excellent display quality of bi-level operation for −43<κ<−41 and 5.0<β<6.0, shows sufficient contrast at an arbitrary driving voltage, has well separated values of the optical transmittance curve for each ON addressing signal and OFF signal, and is less susceptible to cross talk. FIG. 9 shows the preferable range of the parameters κ and β as the hatched area in the figure.

Example 5

A transparent conductive film of indium tin oxide (ITO) was deposited by sputter deposition onto a soda-lime glass substrate having a thickness of 1.1 mm to obtain a sheet resistance of 200 ohm/□ for the ITO film. On top of the conductive film was deposited a bottom electrode consisting of chromium and aluminum successively deposited to a thickness of 30 nm each, which was subsequently defined into pixel patterns by photolithography followed by removal of the residual photoresist film.

A hard carbon film was then deposited by plasma CVD using methane as the source gas. The properties of the resultant hard carbon film can be controlled by controlling at least one of the following deposition conditions: gas pressure in the reaction chamber, rf input power, or deposition time.

Chromium and aluminum were successively deposited as a top electrode and subsequently defined into pixel patterns by photolithography.

Following patterning of the top electrode, the portion of the hard carbon film and the bottom electrode overlying the pixel electrode were removed and a resultant MIM device board was produced. Current vs. voltage measurements were subsequently carried out for the MIM device board in a manner similar to Example 1.

Following the measurements, TN liquid crystal displays were fabricated in a manner similar to Example 2, the displays having a plurality of MIM devices having various values of parameters κ and β.

Figure 10:
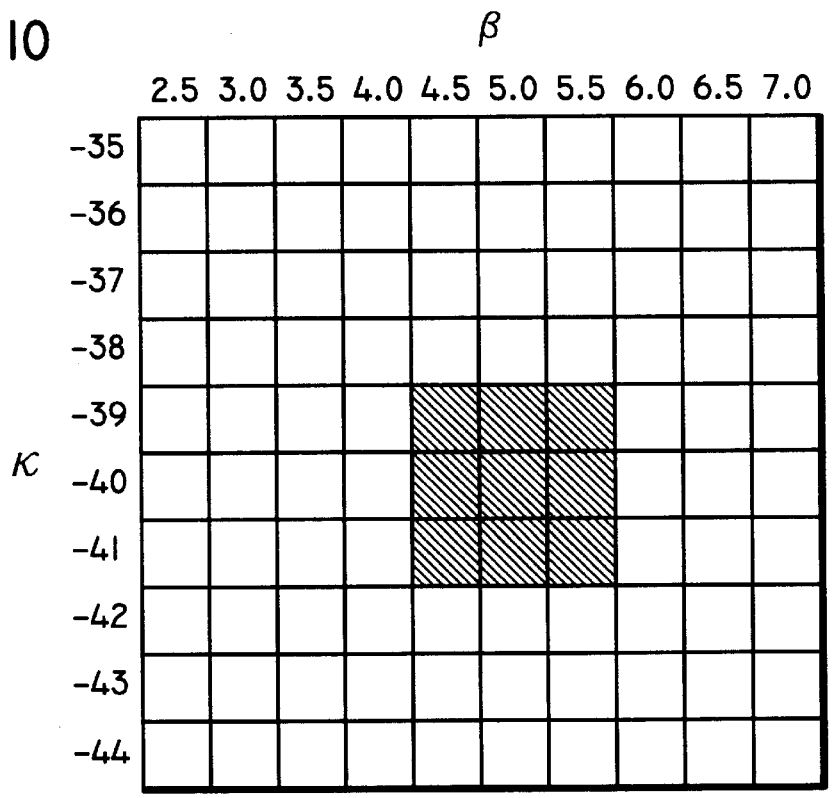
FIG. 10 is an illustration showing the range of preferred values of the parameters κ and β for the low voltage driving operation of the TN type of liquid crystal display of Example 5.

The results of the tests indicate that the liquid crystal displays are operable with low driving voltage −41<κ<−39 and 5.0<β<6.0. The results are summarized in FIG. 10. Liquid crystal display panels with satisfactory display quality at low driving voltage were found for the values of the parameters κ and β as shown by the hatched area in the figure.

Example 6

A transparent conductive film of indium tin oxide (ITO) was deposited by sputter deposition onto a soda-lime glass substrate having a thickness of 1.1 mm to obtain a sheet resistance of 200 ohm/□ for the ITO film. On top of the conductive ITO film was deposited a bottom electrode consisting of chromium and aluminum successively deposited to a thickness of 30 nm each, which was subsequently defined into pixel patterns by photolithography followed by removal of the residual photoresist film.

A hard carbon film was then deposited by plasma CVD using methane as the source gas. The properties of the resultant hard carbon film can be controlled by controlling at least one of the following deposition conditions: gas pressure in the reaction chamber, rf input power, or deposition time.

Chromium and aluminum were successively deposited as a top electrode and subsequently defined into pixel patterns by photolithography.

Following patterning of the top electrode, the portion of the hard carbon film and the bottom electrode overlying the pixel electrode were removed and a resultant MIM device board was produced. Current vs. voltage measurements were carried out for the MIM device board in a manner similar to Example 1.

Following the measurements, TN liquid crystal displays were fabricated in a manner similar to Example 2, the displays having a plurality of MIM devices having various values of parameters κ and β.

Figure 11:
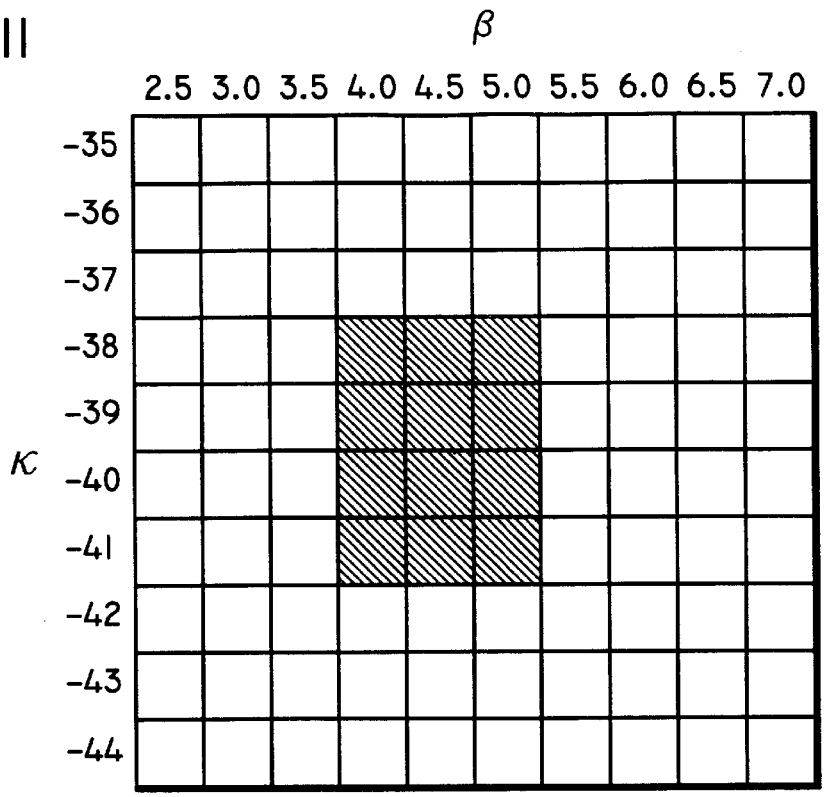
FIG. 11 is an illustration showing the range of preferred values of the parameters κ and β for gray-scale operation of the TN type of liquid crystal display of Example 6.

The results of the tests indicate that the liquid crystal displays exhibit satisfactory display quality for gray scale operation for −41<κ<−38 and 5.0<β<6.0, and exhibits a gradual change in optical characteristics with applied voltage and is less susceptible to crosstalk. The results are summarized in FIG. 11, which shows the preferred range of the parameters κ and β for gray-scale operation as the hatched area.

Example 7

A transparent conductive film of indium tin oxide (ITO) was deposited by sputter deposition onto a soda-lime glass substrate having a thickness of 1.1 mm to obtain a sheet resistance of 200 ohm/□ for the ITO film. On top of the conductive ITO film was deposited a bottom electrode consisting of chromium and aluminum successively deposited to a thickness of 30 nm each, which was subsequently defined into pixel patterns by photolithography followed by removal of the residual photoresist film.

A hard carbon film was then deposited by plasma CVD using methane as the source gas. The properties of the resultant hard carbon film were controlled by controlling at least one of the following deposition conditions: gas pressure in the reaction chamber, rf input power, or deposition time.

Chromium and aluminum were successively deposited as a top electrode and subsequently defined into pixel patterns by photolithography.

Following patterning of the top electrode, the portion of the hard carbon film and the bottom electrode overlying the pixel electrode were removed and a resultant MIM device board was produced. Current vs. voltage measurements were subsequently carried out for the MIM device board in a manner similar to Example 1.

Following the measurements, polymer dispersed types of liquid crystal displays were fabricated in a manner similar to Example 2, the displays having a plurality of MIM devices having various values of parameters κ and β.

The results of the operation tests indicate that liquid crystal display panels suitable for polymer dispersed liquid crystal displays were observed for panels with $-41<\kappa<-39$ and $3.0<\beta<5.0$, the displays having low resistance during a non-addressed period which results in less deterioration for high applied voltages.

Figure 12:
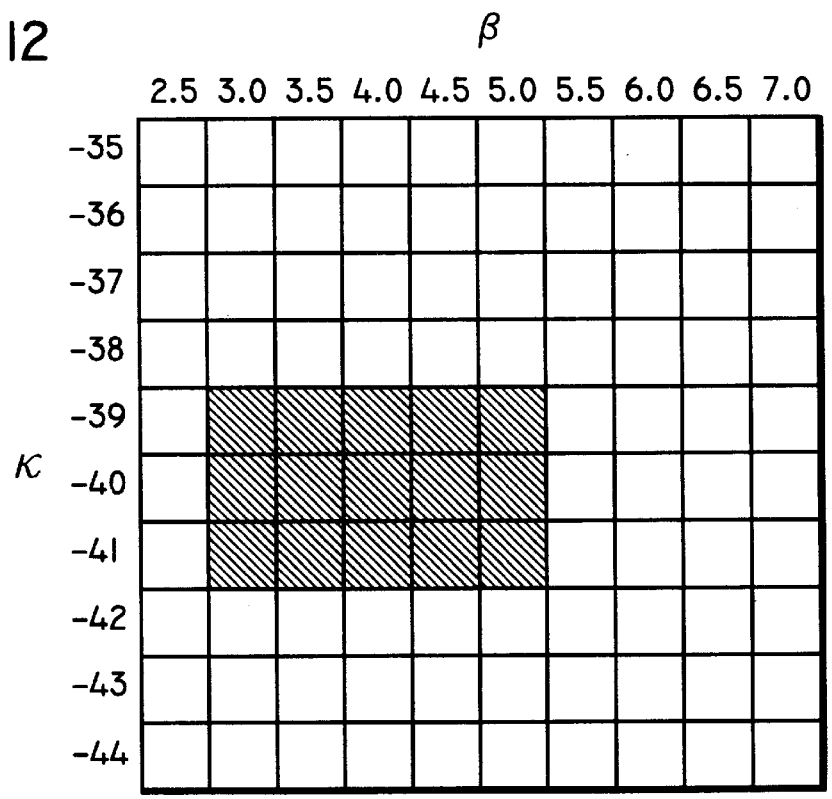
FIG. 12 is an illustration showing the range of preferred values of the parameters κ and β for driving the polymer dispersed type of liquid crystal display of Example 7.

The results are summarized in FIG. 12, showing the preferred range of the parameters κ and β for the operation of the polymer dispersed liquid crystal display as the hatched area.

Example 8

A plurality of liquid crystal displays having various capacitance ratios of the MIM switching device relative to the liquid crystal layer were fabricated in a manner similar to Example 3, and were subsequently subjected to continuous operation tests for 1000 hours.

Figure 13:
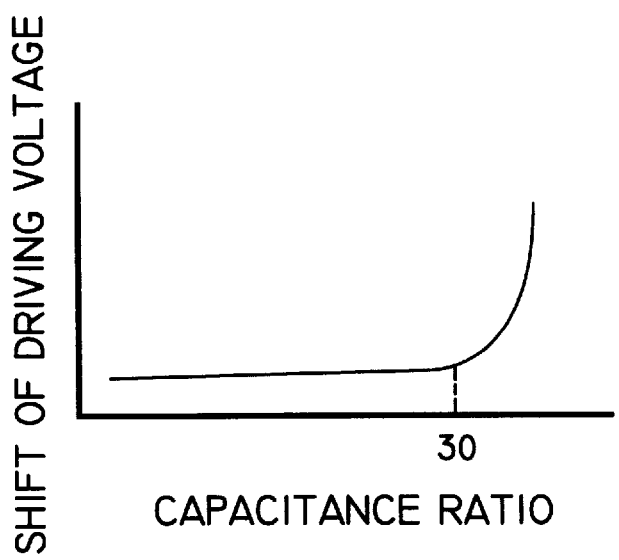
FIG. 13 is a graph showing the change in the capacitance ratio of an MIM switching device to a liquid crystal layer using the driving voltage of Example 8.

The results indicate that, for the displays with a capacitance ratio, $C_{MIM}/C_{LCL}$, of 1/30 or less, a shift of the optical transmittance vs. voltage characteristic toward a higher voltage, or a so called "image sticking" effect, is evident. By controlling the capacitance ratio, $C_{MIM}/C_{LCL}$, to be 1/30 or greater, therefore, the above-mentioned undesirable shift was successfully prevented, as shown by the present invention. The change in the capacitance ratio, $C_{LCL}/C_{MIM}$, with driving voltage is shown in FIG. 13. With the capacitance ratio of the liquid crystal layer to the MIM device plotted as the x coordinate, the figure shows a smaller shift in the driving voltage for a capacitance ratio less than 30, indicating less susceptibility to the image sticking effect for these values of capacitance ratio.

Example 9

The deposition of a hard carbon film can be achieved even at room temperature. Therefore, a sheet or film of plastic can be employed as the substrate in place of the glass plate conventionally utilized. In the case of plastics, several requirements are additionally imposed, such as (1) durability during the manufacturing process, (2) minimal change in length and/or shape, and (3) optical properties suitable for the type of liquid crystal display of interest. Examples of such substrate materials preferably include polysulfone, polycarbonate, polyolefine, polyethersulfone, acrylate, and polyethylterephthalate. A variety of other materials can also be employed by providing a protective film of organic or inorganic substance on the plastic substrate prior to the deposition of the hard carbon film.

In the present invention, there was employed a sheet of polycarbonate film having a thickness of 300 microns. On both sides of the sheet $SiO_2$ layers were deposited by sputter deposition to a thickness of 100 nm to produce a substrate.

Although the manufacturing process for liquid crystal displays with plastic substrates are generally similar to those for displays with glass plate substrates, the deformation of the plastic substrate has to be prevented by controlling stress in the film because of the lower stiffness of plastic films compared with glass. In addition, chemicals such as common etchants and photoresist, for example, have to be appropriately selected for the process in view of the lower resistance of the plastic substrates to these chemicals.

By the use of such a substrate, an MIM device board and a counter electrode board having delineated transparent conductive electrodes were fabricated, followed by processing similar to Example 1 to produce liquid crystal display panels.

The liquid crystal display panels thus fabricated are thin, light in weight, and hard to break. In addition, because of the thinness of the substrate, the liquid crystal displays are capable of displaying very clear images, especially in reflection type liquid crystal displays. Although there is described only an example using plastic boards for both the top and bottom substrates in the embodiment, it is entirely possible to use a plastic board as one of the two substrates, depending on the application.

The results described in the examples indicate that the MIM devices of the present invention are capable of providing switching devices suitable for various liquid crystal displays. The results also clearly indicate that by controlling the properties of the hard carbon film used as an insulating layer of the switching devices, which are adequately represented by the parameters κ and β, and properly combining them with the liquid crystal layer in the liquid crystal pixel elements, liquid crystal displays can be provided. Several ranges of the parameters κ and β are also found for fabricating displays with improved durability such as low driving voltage, high duty ratio and/or gray scale operation, and polymer dispersed LC display operation as well.

As aforementioned, a plurality of MIM devices with a hard carbon film as an insulating layer of the switching element can be fabricated having various electrical and optical properties by controlling the thickness and/or other characteristics of the hard carbon film. In regard to the switching operation of liquid crystal displays using the MIM devices, it is possible to control the optical properties of the liquid crystal layer satisfactorily even when the conformity in the electrical and optical properties is not quite achieved between the liquid crystal layer and the MIM devices. However, it is also possible to make full use of the display characteristics by properly designing display components according to the requirements of the display.

For applications such as in portable information display equipment, one of the requirements for the MIM devices is low driving voltage even at the cost of a reduction in contrast. On the other hand, for applications in large-sized and high density displays such as those used with workstations, for example, MIM devices have to be less susceptible to cross talk and be suited to gray-scale operation.

In addition, various values of resistance are required for the wiring and the electrodes, depending on the size and the number of scales of the display. For large-sized and high density displays, materials with high conductivity have to be used to obviate the decrease in potential drop caused by the wiring resistance of the circuits. For small-sized and/or bi-level displays, on the other hand, less expensive materials and more manageable manufacturing processes can be employed.

This application is based on Japanese Patent Application 07-287906, filed with the Japanese Patent Office on Oct. 9, 1995, the entire contents of which are hereby incorporated by reference.

Obviously, additional modifications and variations of the present invention are possible in light of the above teachings. It is therefore to be understood that within the scope of the appended claims, the invention may be practiced otherwise than as specifically described herein.

What is claimed is:

1. An active-matrix (AM) liquid crystal display comprising:

a top insulating substrate;

a bottom insulating substrate;

a plurality of delineated electrodes disposed on said top substrate;

a plurality of pixel electrodes disposed on said bottom substrate such that respective delineated electrodes and pixel electrodes correspond to pixels of said AM liquid crystal display;

a liquid crystal layer disposed between said top and bottom substrates; and a metal-insulator-metal (MIM) switching device provided in each of said pixels of said AM liquid crystal display, said MIM switching device including a first conductor as an electrode, a second conductor connected to a corresponding pixel electrode, and a hard carbon film disposed between said first and second conductors, wherein said MIM switching device exhibits a current (I)-voltage (V) characteristic represented by $$ln(|I|/S) = \beta\sqrt{|V|} + \kappa$$

with [κ<−35,] I representing a current passing through said switching device, V representing a potential applied between said first and said second conductors, and S representing an area of said MIM switching device, and such that for V≧0, I≧0 and for V<0, I<0, wherein one of said top and bottom insulating substrates is made of a film or a sheet of plastic, and wherein a relationship between a capacitance of said liquid crystal layer ($C_{LCL}$) and a capacitance of said MIM switching device ($C_{MIM}$) is represented by $$3(C_{MIM}) \geq (C_{LCL}) < 10(C_{MIM})$$

when said liquid crystal layer is operated at less than about 5 volts.

2. An active-matrix (AM) liquid crystal display comprising:

a top insulating substrate;

a bottom insulating substrate;

a plurality of delineated electrodes disposed on said top substrate;

a plurality of pixel electrodes disposed on said bottom substrate, respective delineated electrodes and pixel electrodes corresponding to pixels of said AM liquid crystal display;

a liquid crystal layer disposed between said top and bottom substrates; and a metal-insulator-metal (MIM) switching device provided in each of said pixels of said AM liquid crystal display, said MIM switching device including a first conductor as an electrode, a second conductor connected to a corresponding pixel electrode, and a hard carbon film disposed between said first and second conductors, wherein said MIM switching device exhibits a current (I) - voltage (V) characteristic represented by $$ln(|I|/S) = \beta\sqrt{|V|} + \kappa$$

with [β<7,] I representing a current passing through said MIM switching device, V representing a potential applied between said first and second conductors, and S representing an area of said MIM switching device, and such that for V≧0, I≧0 and for V<0, I<0, wherein one of said top and bottom insulating substrates is made of a film or a sheet of plastic, and a relationship between a capacitance of said liquid crystal layer ($C_{LCL}$) and a capacitance of said MIM switching device ($C_{MIM}$) is represented by $$(C_{LCL}) \geq 30(C_{MIM})$$

so as to reduce susceptibility to an image sticking effect.

3. An AM liquid crystal display according to claim 1, wherein said MIM switching device exhibits said I-V characteristic represented by $ln(|I|/S) = \beta\sqrt{|V|} + \kappa$ with κ and β being approximately given by −43<κ<−38 and 3.0<β<6.0.

4. An AM liquid crystal display according to claim 2, wherein said MIM switching device exhibits said I-V characteristic represented by $ln(|I|/S) = \beta\sqrt{|V|} + \kappa$ with κ and β being approximately given by −43<κ<−38 and 3.0<β<6.0.

5. An AM liquid crystal display according to claim 1, wherein κ<−35.

6. An AM liquid crystal display according to claim 2, wherein κ<−35.

7. An AM liquid crystal display according to claim 1, wherein β<7.

8. An AM liquid crystal display according to claim 2, wherein β<7.

* * * * *